United States Patent
Mari et al.

(10) Patent No.: US 7,626,438 B2
(45) Date of Patent: Dec. 1, 2009

(54) CIRCUIT TO SWITCH BETWEEN CLOCK SIGNALS AND RELATED METHOD

(75) Inventors: Ugo Mari, Tremestieri (IT); Santi Carlo Adamo, Gravina di Catania (IT); Gaetano Di Stefano, Palermo (IT); Fabrizio Meli, Misterbianco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 456 days.

(21) Appl. No.: 11/430,527

(22) Filed: May 8, 2006

(65) Prior Publication Data

US 2007/0257710 A1    Nov. 8, 2007

(30) Foreign Application Priority Data

May 6, 2006  (IT) ........................... TO2005A0307

(51) Int. Cl.
H03K 17/00  (2006.01)
(52) U.S. Cl. .................... 327/298; 327/99; 327/407; 331/49
(58) Field of Classification Search .................. 331/49; 327/99, 294, 293, 298, 407; 26/93, 96
See application file for complete search history.

(56) References Cited

U.S. PATENT DOCUMENTS

| 5,483,185 A * | 1/1996 | Scriber et al. ................. 327/99 |
| 5,604,452 A | 2/1997 | Huang |
| 5,790,609 A | 8/1998 | Swoboda |
| 6,501,304 B1 * | 12/2002 | Boerstler et al. ............. 327/99 |
| 6,593,780 B2 | 7/2003 | Lammers |
| 2005/0012525 A1 * | 1/2005 | Starr et al. .................... 327/18 |

* cited by examiner

*Primary Examiner*—Robert Pascal
*Assistant Examiner*—Ryan J. Johnson
(74) *Attorney, Agent, or Firm*—Kevin D. Jablonski; Graybeal Jackson LLP

(57) ABSTRACT

An embodiment of a circuit switches between at least a first clock signal and a second clock signal in response to a corresponding switch command, and includes a selection module to select at a switch instant said second clock signal under the control of a signal selector. The circuit comprises a logic-based filter module located downstream of said selection module and configured to produce an outgoing clock signal filtered under the control of a filter signal and also includes a control module configured to receive said switch command and to send said select signal to said selection module delaying said switch instant by a first interval of time, said control module also being configured to send said active filter signal to said filter module in a second interval of time that comprises an edge of the first clock signal and an edge of the second clock signal.

41 Claims, 2 Drawing Sheets

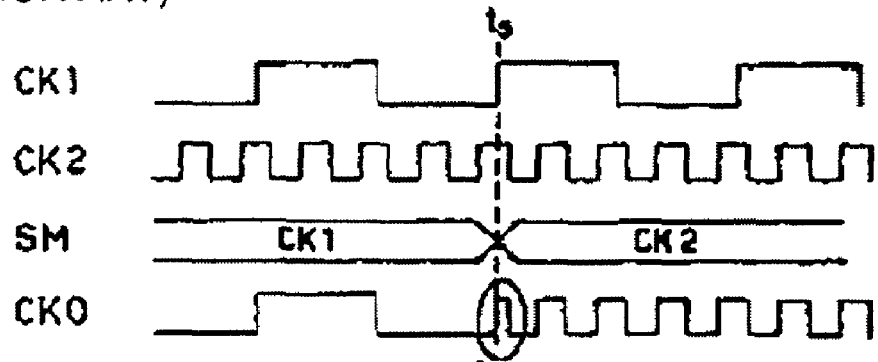
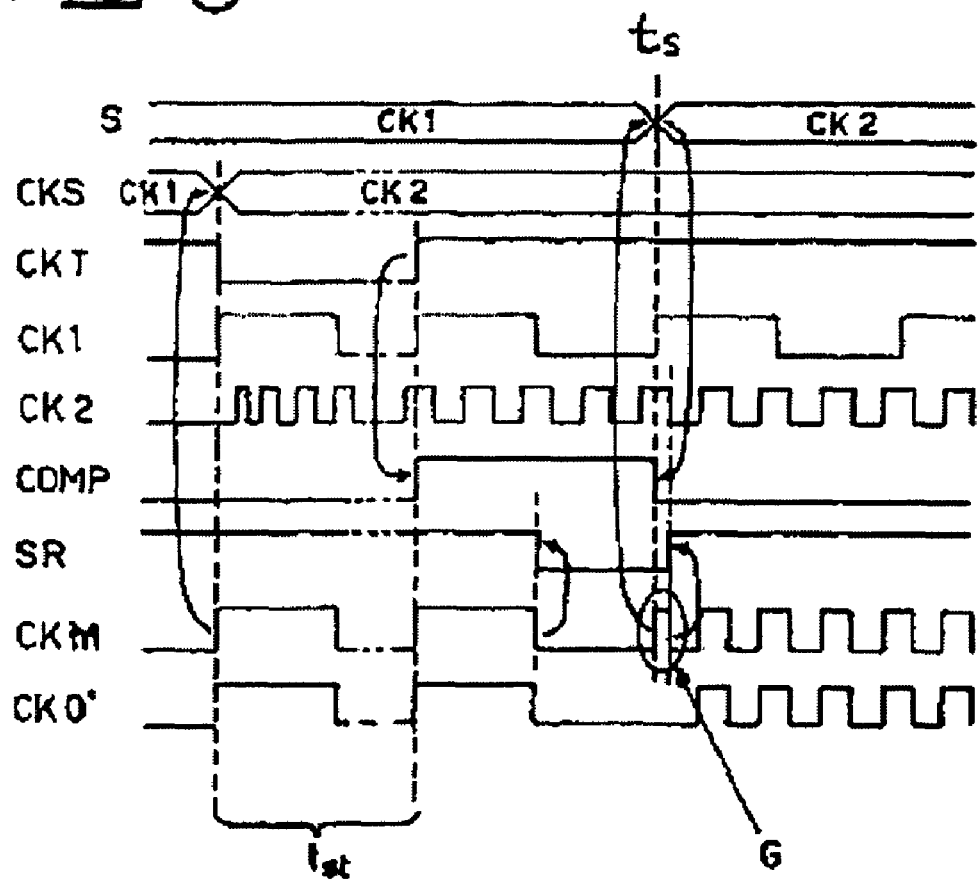

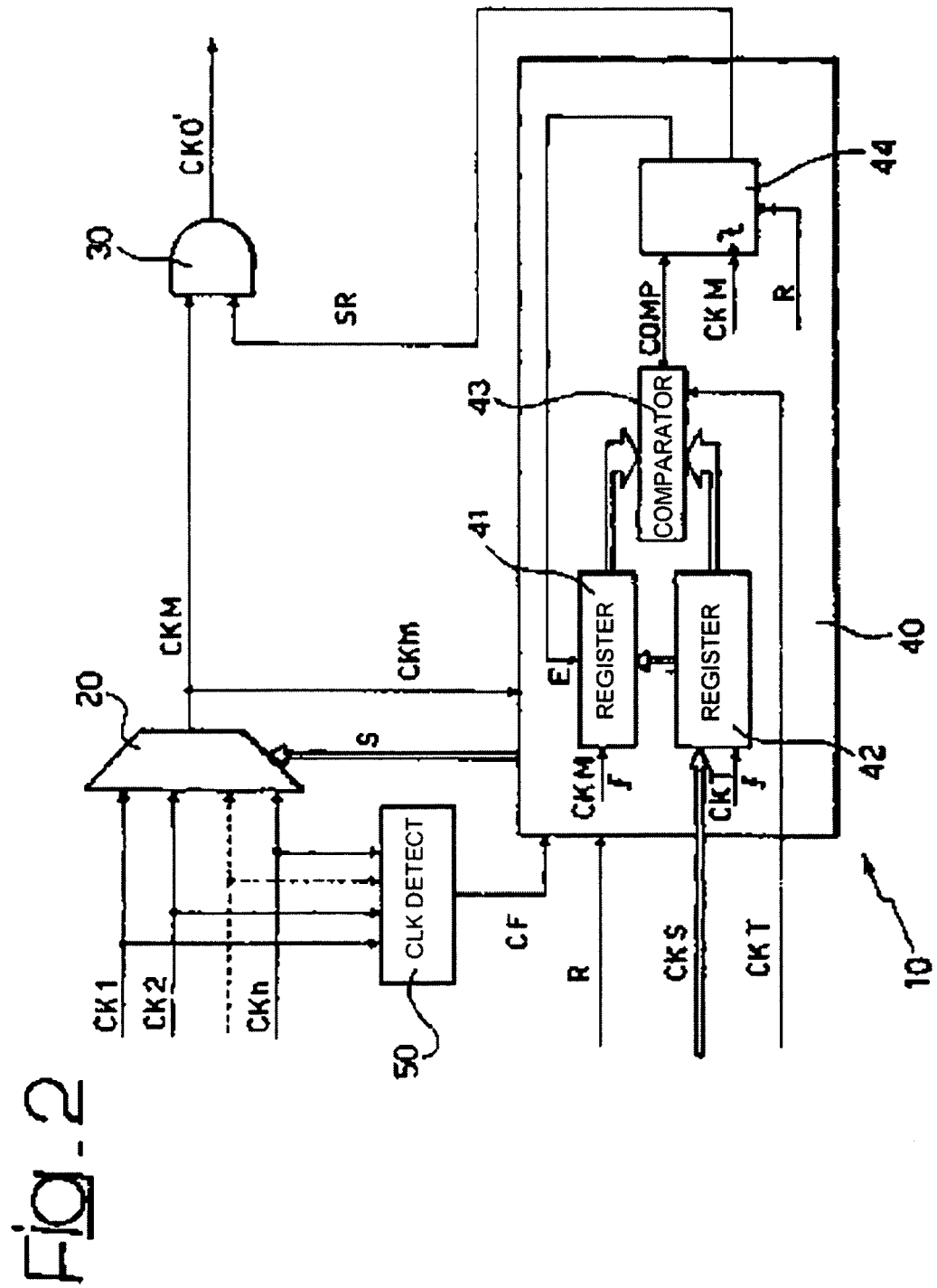
Fig_2

CIRCUIT TO SWITCH BETWEEN CLOCK SIGNALS AND RELATED METHOD

PRIORITY CLAIM

This application claims priority from Italian patent application No. TO2005A000307, filed May 6, 2005, which is incorporated herein by reference.

TECHNICAL FIELD

An embodiment of the present invention relates generally to circuits and methods to generate clock signals selected by switching from a plurality of clock signals, in particular asynchronous clock signals operating at different frequencies in micro-controllers. The field of application of the invention clearly extends to all electronic devices in which there is switching among clock signals.

BACKGROUND

Devices such as micro-controllers require clock signals for their operation. This clock signal determines the operating frequencies of the circuits of the micro-controller.

It is possible, and frequently occurs, that a micro-controller operates employing a source of clock signals at high frequency, in order to achieve high performance, or a source of clock signals at low frequency, in order to reduce power consumption. For this reason it is frequently desirable to be able to change the source of clock signals on command during operation of the micro-controller.

In order to switch between two different sources of clock signals, it is necessary to ensure, for instance in applications on micro-controllers where the clock signal must be provided to the central processing unit (CPU), that the clock signal is free of spurious impulses generated by the switching operation between asynchronous signals at different frequencies, such spurious impulses also being known as "glitches".

FIG. 1 is a time graph that represents, as an example, the pattern of clock signals in a micro-controller according to the known technology. The diagram represents a first clock signal CK1 at a first frequency and a second clock signal CK2 at a second frequency, the second frequency being higher than the first frequency. SM indicates a select signal that acts on a selection module, for example a multiplexer circuit, to switch between the first clock signal CK1 and the second clock signal CK2. CKO indicates an outgoing clock signal that, for example, is sent to the CPU.

As may be seen in FIG. 1, in correspondence with a switch instant $t_s$, in which the multiplexer circuit selects the second clock signal CK2 under control of the select signal SM, a spurious impulse or glitch G is formed on the outgoing clock signal CKO, due to the act of switching between asynchronous signals at different frequencies.

Many circuits are known in the literature that deal with avoiding the problem of creating glitches.

Known circuits perform a switch control based on one of the external clock signals: a limitation of such circuits, however, lies in the fact that when the external signal stops, for example due to the quartz of the oscillator breaking, operation of the circuit is likewise interrupted.

Other solutions are known, for example from U.S. Pat. Nos. 5,483,185, 5,604,452, and 5,790,609, which are incorporated by reference. However, these solutions present a long switch delay. Further solutions, such as that known from U.S. Pat. No. 6,593,780, which is incorporated by reference, require a high frequency oscillator to be available, incorporated into the device, in order to manage the clock signal switching process.

SUMMARY

An embodiment of the present invention solves at least some of the drawbacks mentioned above and offers a solution that enables the onset of disturbances such as glitches to be controlled.

According to an embodiment of the invention, a clock generator includes a logic circuit coupled to a controller. The logic circuit is operable to select one of multiple input clock signals and to generate an output clock signal from the selected input clock signal. And the controller is operable to switch the logic circuit from selecting a first of the input clock signals to selecting a second of the input clock signals, disable the logic circuit from generating the output clock signal in response to an edge of the first input clock signal that occurs before the controller switches the logic circuit, and enable the logic circuit to generate the output clock signal in response to an edge of the second input clock signal that occurs after the controller switches the logic circuit.

BRIEF DESCRIPTION OF THE DRAWINGS

Embodiments of the invention will now be described, as a pure example without limiting intent, with reference to the attached drawings.

FIG. 1 is a timing diagram of clock signals for a microprocessor according to the prior art.

FIG. 2 shows a circuit for generating a clock signal according to an embodiment of the invention.

FIG. 3 shows a time diagram representing signals occurring in the circuit in FIG. 2 according to an embodiment of the invention.

DETAILED DESCRIPTION

In brief, a circuit according to an embodiment of the invention is proposed that switches between clock signals selected in a plurality of clock signals in response to a switch command sent to a control module, which sends a corresponding select signal to a selection module, in particular a multiplexer, operating on said plurality of clock signals to provide a selected clock signal. This selected clock signal is passed through a digital filter comprising a logic circuit controlled by a filter signal emitted by the control module. The filter signal is made active for control in an interval of time that comprises the last edge of the previous clock signal before the switch instant, and the subsequent first edge of the new clock signal, that is the two edges immediately adjacent to the switch instant that identify the possible spurious impulse. The control module is thus configured for timing the filter signal so that the digital filter eliminates any spurious impulse due to switching. The select signal, considering the propagation time through elements such as registers and flip-flops and the stabilization time of the new clock signal, is likewise conveniently generated by the control module with reference to reception of the switch command.

According to a further embodiment of the invention, the circuit includes a circuit for detecting the clock signal configured for verifying the availability of an active source of clock signals. When this active source of clock signals ceases to function, the switch control module automatically sets registers at a predetermined value that corresponds to selecting a low-frequency and low-consumption internal source of clock signals, available in the architecture of the device in which the proposed circuit is applied.

FIG. 2 shows a circuit for generating clock signals according to an embodiment of the present invention, indicated as a whole with reference 10.

This circuit 10 comprises a multiplexer circuit 20, which receives as inputs a plurality of incoming clock signals CK1 . . . CKn and provides as output a selected clock signal CKM. The multiplexer circuit 20 is controlled with regard to switch selection by a select signal S.

The selected clock signal CKM constitutes one of two inputs into a gate 30 that implements an AND function so as to provide as output an outgoing clock signal CKO' of the circuit to generate a clock signal 10.

According to an embodiment of the invention, this circuit for generating a clock signal 10 also comprises a switch control module 40, that provides at its outputs the select signal S for the multiplexer circuit 20, as well as a filter signal SR to the second input of the AND gate 30 that, when it is at low logic level, activates filtering of the selected clock signal CKM, with the consequent possibility of activating switching between clock signals.

This switch control module 40 receives as input a clock select command CKS, that contains an identifier of which of the n clock signals CK1 . . . CKn available in the microprocessor is to be selected, that may be sent by the user or in any case by the microprocessor, and a stable clock signal CKT, which indicates whether the next selected clock signal is stable or not. In general, to provide the new next selected clock signal, a new oscillator is switched on, and thus a period of time exists in which the output frequency of this new oscillator is not stable. It thus may be necessary to monitor the clock signal sources, with a circuit not described here, and provide this clock signal CKT that indicates to the control module 40 when the new clock signal source is available for use. This switch control module 40 also receives as input the selected clock signal CKM emitted by the multiplexer circuit 20. This switch control module 40 also receives as input a reset signal R as well as a clock stopped warning signal CF originating from the clock signal detector circuit 50. This clock signal detector circuit 50 receives in parallel as inputs the plurality of incoming clock signals CK1 . . . CKn to verify the availability of an active source of clock signals.

The switch control module 40 comprises a register 41, whose output consists of the selector signal S and whose working frequency is scheduled by the selected clock signal CKM, as well as a register 42 likewise scheduled by the selected clock signal CKM that receives and memorizes the incoming clock select command CKS. The registers 41 and 42 have a width of m bits, where m=$\log_2$n, n being the number of clock signals CK1 . . . CKn.

The outputs from the registers 41 and 42 are sent as inputs to a comparator circuit 43. The comparator circuit 43 also receives the stable clock signal CKT as an enable input. The result of the comparison made by the comparator circuit 43 is then sent as a control signal COMP to a flip-flop 44 of the D (delay) type (delay flip-flop). The flip-flop 44 also receives at one of its clock input terminals the selected clock signal CKM and provides as one of its outputs an enable signal E, which is sent back to the enabling input terminal of the register 41. The flip-flop 44 on the contrary provides the filter signal SR at its inverted output.

Operation of the circuit 10 for generating a clock signal will now be illustrated, also in reference to FIG. 3, which represents a time diagram of the signals occurring in the circuit 10.

When the user intends to change the source of clock signals, the clock select command CKS is therefore sent, and is written in the register 42, in order to select a signal from among the plurality of clock signals CK1 . . . CKn as source of clock signals for the microcontroller.

For convenience as an example and also for comparison with the diagrams in FIG. 1 relating to the known technology, it will be supposed that the previous clock signal is the clock signal CK1 at a first frequency and the new clock signal is the clock signal CK2 at a second frequency that is higher than the first frequency.

The clock selection register 42 switches on the leading edge of the previous clock signal CK1, indicating that the clock signal switching process begins. The control signal COMP is then set if the new clock signal CK2 is already stable and different from the preceding one. As has been said, this is signaled through the stable clock signal CKT that, when it is at high logic level, enables the output of the comparator 43. In the diagram in FIG. 3, the stable clock signal CKT is at low logic level during the stabilization time $t_{st}$.

On the successive falling edge of the previous clock signal CK1, the filter signal SR, which is at high logic level, moves to low logical level, thus forcing the output clock signal CKO' to low logic level, through the AND gate 30.

The gate 30 then performs a digital filter function during switching from the previous clock signal CK1 to the new clock signal CK2. As may be seen in the diagram in FIG. 3, indeed, the glitch G that originates in switching onto the selected clock signal CKM, consisting of the leading edge of the previous clock signal CK1 and the falling edge of the new clock signal CK2 both adjacent to the switching instant $t_s$, is not present on the outgoing clock signal CKO', whose value is maintained logic low by the low logic value of the filter signal SR entering the gate 30 that activates the filter operation.

At the following falling edge of the first clock signal CK1, contemporaneously to when the filter signal SR goes to low logic level, the enable signal E that operates on the register 41 assumes high logic value, so that the register 41 is loaded on the next leading edge of the first clock signal CK1 with the content of the register 42, that is the value relative to the new clock signal to be selected. This value is sent through the selector signal S to the multiplexer 20, thus determining the selection of the new clock signal CK2 as selected clock signal CKM.

The control signal COMP generated by the comparator 43, due to the identity between the contents of the two registers 41 and 42, goes to low logic level and thus the filter signal SR may transit to high logic level at the subsequent falling edge of the selected clock signal CKM that schedules the flip-flop 44, that now however corresponds to the new clock signal CK2.

When the filter signal SR again moves to high logic level, the switching process is considered terminated and the outgoing clock signal CKO', glitch-free, is available to the system.

The detector circuit 50 operates through the clock stopped signal CF on the register 41 to select the internal signal source should the circuit be switching from a clock signal source that is no longer available, for example due to breaking of the quartz of the oscillator. The clock stopped signal CF sets the register 41, and consequently the select signal S, to a default value that corresponds to selecting an internal source of clock signals at low frequency and low consumption, available in the architecture of the micro-controller. Any subsequent switches of the clock signal may then occur on the basis of such default clock source.

The circuit according to this embodiment of the invention, advantageously, thus does not require an auxiliary clock signal source at higher frequency to supervise the switching process, thus there is no energy consumption due to that high frequency source to be maintained always active.

The circuit according to an embodiment of the invention enables rapid glitch-free switching, despite being of very simple structure and occupying a very limited area on the chip. Furthermore, the circuit according to an embodiment of the invention entails low power consumption and is thus suitable for low-consumption devices.

Referring again to FIG. 2, the circuit 10 may be incorporated in an integrated circuit (IC) such as a microprocessor, which may be incorporated into an electronic system such as a computer system.

As a consequence, the principle of the invention remaining the same, the construction details and embodiments may vary, also widely significantly, with respect to what is described and illustrated here, as a simple example without limiting intent, without thereby departing from the spirit and scope of the invention, as defined by the claims that follow.

What is claimed is:

1. Circuit for switching between at least a first clock signal and a second clock signal belonging to a plurality of clock signals available in an electronic device in response to a corresponding switch command, that includes a selection module to select at a switch instant said second clock signal in said plurality of clock signals under the control of a select signal and provide a selected clock signal, wherein the circuit further includes a logic-based filter module situated downstream from said selection module and configured to produce an outgoing clock signal filtered under the control of a filter signal and also includes a control module configured to receive said switch command and to send said select signal to said selection module delaying said switch instant by a first interval of time, said control module also being configured to send said filter signal active for filtering to said filter module in a second interval of time that comprises one and only one edge of the first clock signal and one and only one edge of the second clock signal that are adjacent to said switch instant.

2. Circuit according to claim 1, wherein said control module comprises a first register that receives as input said switch command and a second register that provides as output said select signal, said first register and said second register being associated with a comparator module configured to compare contents of said first register and second register and provide a corresponding control signal to a delay element.

3. Circuit according to claim 2, wherein said switch command contains an identifier of said second clock signal to be selected.

4. Circuit for switching between at least a first clock signal and a second clock signal belonging to a plurality of clock signals available in an electronic device in response to a corresponding switch command, that includes a selection module to select at a switch instant said second clock signal in said plurality of clock signals under the control of a select signal and provide a selected clock signal, wherein the circuit further includes a logic-based filter module situated downstream from said selection module and configured to produce an outgoing clock signal filtered under the control of a filter signal and also includes a control module configured to receive said switch command and to send said select signal to said selection module delaying said switch instant by a first interval of time, said control module also being configured to send said filter signal active for filtering to said filter module in a second interval of time that comprises an edge of the first clock signal and an edge of the second clock signal that are adjacent to said switch instant;

wherein said control module comprises a first register that receives as input said switch command and a second register that provides as output said select signal, said first register and said second register being associated with a comparator module configured to compare contents of said first register and second register and provide a corresponding control signal to a delay element; and wherein said delay element provides as first output a signal enabling the switch command to be written to the first register and as second output, inverted with regard to said first output, the filter signal for the filter module.

5. Circuit according to claim 4, wherein said delay element comprises a delay flip-flop.

6. Circuit according to claim 2, wherein said first register, second register and delay element receive as clock signal the selected clock signal.

7. Circuit according to claim 2, wherein said comparator module is enabled to function by a signal indicative of a stability of the second clock signal to be selected.

8. Circuit according to claim 7, wherein said signal indicative of the stability of the second clock signal to be selected introduces a stabilizing delay comprised within said first interval of time.

9. Circuit according to claim 8, wherein said first interval of time comprises a propagation time in said delay element and said first register.

10. Circuit according to claim 2, further including a detector circuit configured to verify an availability of an active source of clock signals in said plurality of clock signals and provide a clock stopped warning signal to said control module.

11. Circuit according to claim 10, wherein said control module is configured so as to automatically set a predetermined value on said second register on reception of said clock stopped warning signal.

12. Circuit according to claim 11, wherein said predetermined value corresponds to selecting an internal clock signal source at low-frequency and low consumption.

13. Circuit according to claim 1, wherein said filter module comprises a gate controlled by said filter signal.

14. Circuit according to claim 1, wherein said selection module comprises a multiplexer.

15. Process to switch between at least a first clock signal and a second clock signal belonging to a plurality of clock signals in response to a corresponding switch command, that comprises selecting said second clock signal in said plurality of clock signals under the control of a select signal emitted at a switching instant and of providing a selected clock signal further including:

applying a logic-based filter after said selection to produce an outgoing clock signal filtered under the control of a filter signal;

receiving said switch command and operating said selection at a switch instant that is delayed by a first interval of time with regard to the reception of said switch command, commanding the filtering of said clock selected signal in a second interval of time that comprises an edge of the first clock signal and one and only one edge of the second clock signal that are adjacent to said switch instant.

16. Process according to claim 15, further including writing said switch command initially in a first register and writing said switch command in a second register concomitant with the activation of said filter operation.

17. Process to switch between at least a first clock signal and a second clock signal belonging to a plurality of clock signals in response to a corresponding switch command, that comprises selecting said second clock signal in said plurality of clock signals under the control of a select signal emitted at a switching instant and of providing a selected clock signal further including:
- applying a logic-based filter after said selection to produce an outgoing clock signal filtered under the control of a filter signal;
- receiving said switch command and operating said selection at a switch instant that is delayed by a first interval of time with regard to the reception of said switch command,
- commanding the filtering of said clock selected signal in a second interval of time that comprises an edge of the first clock signal and an edge of the second clock signal that are adjacent to said switch instant;
- further including writing said switch command initially in a first register and writing said switch command in a second register concomitant with the activation of said filter operation; and
- further including comparing the outputs of said first register and second register to command a delay element.

18. Process according to claim 17, wherein said switch command contains an identifier of said second clock signal to be selected.

19. Process according to claim 18, wherein the signal to enable writing of said switch command to the second register and to activate said filtering are inverted one with regard to the other.

20. Process according to claim 17, further including sending as clock signal the selected clock signal to said first register, second register and delay element.

21. Process according to claim 17, further including enabling said comparison operation comparing the outputs of said first register and second register through a signal indicative of the stability of the second clock signal to be selected.

22. Process according to claim 21, wherein said signal indicative of the stability of the second clock signal to be selected introduces a stabilization delay comprised within said first interval of time.

23. Process according to claim 20, wherein said first interval of time comprises a propagation time in said delay element and said second register.

24. Process according to claim 16, further including detecting an availability of an active source of clock signals in said plurality of clock signals and signaling any stoppages of the active clock signal.

25. Process according to claim 24, further including automatically setting said second register to a predetermined value consequent on said signal that the active clock signal has stopped.

26. Process according to claim 25, wherein said predetermined value corresponds to selecting an internal source of clock signals at low-frequency and low consumption.

27. Circuit according to claim 1, wherein the circuit is included in a micro-controller.

28. A clock generator, comprising:
- a logic circuit operable to select one of multiple input clock signals and to generate an output clock signal from the selected input clock signal; and
- a controller coupled to the logic circuit and operable to
  - switch the logic circuit from selecting a first of the input clock signals to selecting a second of the input clock signals,
  - disable the logic circuit from generating the output clock signal in response to an edge of the first input clock signal, the edge of the first clock signal comprising the previous edge that occurs before the controller switches the logic circuit, and
  - enable the logic circuit to generate the output clock signal in response to an edge of the second input clock signal, the edge of the second clock signal comprising the next edge that occurs after the controller switches the logic circuit.

29. The clock generator of claim 28, wherein the logic circuit further comprises:
- an output node operable to carry the output clock signal;
- a logic gate operable to pass the selected input clock signal to the output node as the output clock signal in response to a filter signal from the controller having an enable value, and operable to block the selected input clock signal from the output node in response to the filter signal having a disable value; and
- a multiplexer operable to receive the multiple input clock signals and to provide the selected input clock signal to the logic gate in response to a select signal from the controller.

30. A clock generator, comprising:
- a logic circuit operable to select one of multiple input clock signals and to generate an output clock signal from the selected input clock signal; and
- a controller coupled to the logic circuit and operable to
  - switch the logic circuit from selecting a first of the input clock signals to selecting a second of the input clock signals,
  - disable the logic circuit from generating the output clock signal in response to an edge of the first input clock signal that occurs before the controller switches the logic circuit, and
  - enable the logic circuit to generate the output clock signal in response to an edge of the second input clock signal that occurs after the controller switches the logic circuit;
- wherein the controller comprises:
  - a first register operable to store a first identifier that corresponds to the first input clock signal and to generate a select signal that causes the logic circuit to select the input clock signal corresponding to the first stored identifier;
  - a second register operable to store a second identifier that corresponds to the second input clock signal;
  - a comparator operable to compare the contents of the first register with the contents of the second register; and
  - a flip-flop responsive to the selected input clock signal and operable to
    - disable the logic circuit from generating the output clock signal, and switch the logic circuit by causing the second register to load the second identifier into the first register, in response to the comparator indicating that the contents of the first register do not equal the contents of the second register; and
    - enable the logic circuit to generate the output clock signal in response to the comparator indicating that the contents of the first register equal the contents of the second register.

31. A clock generator, comprising:
- a logic circuit operable to select one of multiple input clock signals and to generate an output clock signal from the selected input clock signal; and a controller coupled to the logic circuit and operable to
switch the logic circuit from selecting a first of the input clock signals to selecting a second of the input clock signals,
disable the logic circuit from generating the output clock signal in response to an edge of the first input clock signal that occurs before the controller switches the logic circuit, and
enable the logic circuit to generate the output clock signal in response to an edge of the second input clock signal that occurs after the controller switches the logic circuit;
wherein the controller comprises:
a first register operable to store a first identifier that corresponds to the first input clock signal and to generate a select signal that causes the logic circuit to select the input clock signal corresponding to the first stored identifier;
a second register operable to store a second identifier that corresponds to the second input clock signal;
a comparator operable to compare the contents of the first register with the contents of the second register in response to the second input clock signal having a stable frequency; and
a flip-flop responsive to the selected input clock signal and operable to
disable the logic circuit from generating the output clock signal, and switch the logic circuit by causing the second register to load the second identifier into the first register, in response to the comparator indicating that the contents of the first register do not equal the contents of the second register; and
enable the logic circuit to generate the output clock signal in response to the comparator indicating that the contents of the first register equal the contents of the second register.

32. The clock generator of claim 28, wherein the first and second input clock signals have different phases.

33. The clock generator of claim 28 wherein the controller is further operable to:
determine whether the selected input clock signal is valid; and
cause the logic circuit to generate the output clock signal from other than the selected clock signal if the selected clock signal is not valid.

34. An integrated circuit, comprising:
a clock generator, comprising,
a logic circuit operable to select one of multiple input clock signals and to generate an output clock signal from the selected input clock signal, and
a controller coupled to the logic circuit and operable to
switch the logic circuit from selecting a first of the input clock signals to selecting a second of the input clock signals,
disable the logic circuit from generating the output clock signal in response to an edge of the first input clock signal, the edge of the first clock signal comprising the most proximate edge that occurs before the controller switches the logic circuit, and
enable the logic circuit to generate the output clock signal in response to an edge of the second input clock signal, the edge of the second clock signal comprising the most proximate edge that occurs after the controller switches the logic circuit.

35. An electronic system, comprising:
an integrated circuit, comprising,
a clock generator, comprising,
a logic circuit operable to select one of multiple input clock signals and to generate an output clock signal from the selected input clock signal, and
a controller coupled to the logic circuit and operable to
switch the logic circuit from selecting a first of the input clock signals to selecting a second of the input clock signals,
disable the logic circuit from generating the output clock signal in response to an edge of the first input clock signal, the edge of the first clock signal comprising the most proximate edge that occurs before the controller switches the logic circuit, and
enable the logic circuit to generate the output clock signal in response to an edge of the second input clock signal, the edge of the second clock signal comprising the most proximate edge that occurs after the controller switches the logic circuit.

36. A method, comprising:
generating an output clock signal from a first input clock signal;
receiving a request to generate the output clock signal from a second input clock signal;
halting generation of the output clock signal in response to a first edge of the first input clock signal, the first edge occurring after the request is received; and
starting generation of the output clock signal from the second input clock signal in response to an edge of the second input clock signal, the edge of the second clock signal being the first edge of the second clock signal occurring after the edge of the first input clock signal.

37. The method of claim 36 wherein:
generating the output clock signal from the first input clock signal comprises generating the output clock signal equal to the first input clock signal; and
generating the output clock signal from the second input clock signal comprises generating the output clock signal equal to the second input clock signal.

38. The method of claim 36 wherein receiving the request comprises receiving an identifier corresponding to the second input clock signal.

39. The method of claim 36 wherein:
halting generation of the output clock signal comprises disabling a logic gate that receives the first input clock signal on an input node and that generates the output clock signal on an output node; and
starting the generation of the output clock signal comprises coupling the second input clock signal to the input node and enabling the logic gate.

40. The method of claim 36 wherein the edge of the second input clock signal occurs after a second edge of the first clock signal, the second edge occurring after the first edge of the first input clock signal.

41. The method of claim 36 wherein the edges of the first and second input clock signals are of a same type.

* * * * *

UNITED STATES PATENT AND TRADEMARK OFFICE
CERTIFICATE OF CORRECTION

| | | |
|---|---|---|
| PATENT NO. | : 7,626,438 B2 | Page 1 of 1 |
| APPLICATION NO. | : 11/430527 | |
| DATED | : December 1, 2009 | |
| INVENTOR(S) | : Mari et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 570 days.

Signed and Sealed this

Second Day of November, 2010

David J. Kappos
*Director of the United States Patent and Trademark Office*